United States Patent
Song et al.

(10) Patent No.: US 11,594,091 B2
(45) Date of Patent: Feb. 28, 2023

(54) GATE DEVICE SYSTEM AND CONTROL METHOD THEREOF

(71) Applicant: ZHEJIANG DAHUA TECHNOLOGY CO., LTD., Zhejiang (CN)

(72) Inventors: Jiacai Song, Hangzhou (CN); Kang Du, Hangzhou (CN)

(73) Assignee: ZHEJIANG DAHUA TECHNOLOGY CO., LTD., Hangzhou (CN)

( * ) Notice: Subject to any disclaimer, the term of this patent is extended or adjusted under 35 U.S.C. 154(b) by 0 days.

(21) Appl. No.: 17/348,917

(22) Filed: Jun. 16, 2021

(65) Prior Publication Data
US 2021/0312737 A1 Oct. 7, 2021

Related U.S. Application Data

(63) Continuation of application No. PCT/CN2018/123889, filed on Dec. 26, 2018.

(51) Int. Cl.
*G06K 9/00* (2022.01)
*G07C 9/15* (2020.01)
(Continued)

(52) U.S. Cl.
CPC .............. *G07C 9/15* (2020.01); *G01L 5/1623* (2020.01); *G07C 9/32* (2020.01); *G08B 7/06* (2013.01)

(58) Field of Classification Search
CPC ... G07C 9/15; G07C 9/32; G07C 9/20; G07C 9/30; G07C 9/00; G07C 2209/62; G01L 5/1623; G08B 7/06
See application file for complete search history.

(56) References Cited

U.S. PATENT DOCUMENTS 4,627,193 A 12/1986 Schwarz
2004/0017929 A1* 1/2004 Bramblet ................. G07C 9/00
382/103

(Continued)

FOREIGN PATENT DOCUMENTS

CN 101246608 A 8/2008
CN 101859448 A 10/2010
(Continued)

OTHER PUBLICATIONS

International Search Report in PCT/CN2018/123889 dated Sep. 30, 2019, 4 pages.
(Continued)

*Primary Examiner* — An T Nguyen
(74) *Attorney, Agent, or Firm* — Metis IP LLC

(57) ABSTRACT

A method for controlling a gate device in connection with at least one gate and two frameworks connected to the at least one gate is provided. The method may include identifying an authorization status of an object. The method may include detecting pressure signals caused by the object at a first moment, if the authorization status is satisfied. The method may include determining whether or not an illegal tailgating event occurred based on the pressure signals. The method may further include generating a control signal for opening the at least one gate to facilitate the object to pass through the at least one gate in response to a determination that the illegal tailgating event did not occur.

16 Claims, 7 Drawing Sheets

(51) Int. Cl.
    *G01L 5/1623*     (2020.01)
    *G07C 9/32*     (2020.01)
    *G08B 7/06*     (2006.01)

(56) References Cited

U.S. PATENT DOCUMENTS

| | | | |
|---|---|---|---|
| 2007/0268145 A1* | 11/2007 | Bazakos | G07C 9/28 340/521 |
| 2008/0308322 A1 | 12/2008 | Augustyniak et al. | |
| 2016/0343217 A1 | 11/2016 | Loidreau et al. | |
| 2018/0033226 A1 | 2/2018 | Robertson | |

FOREIGN PATENT DOCUMENTS

| | | |
|---|---|---|
| CN | 103236103 A | 8/2013 |
| CN | 203733180 U | 7/2014 |
| CN | 204680085 U | 9/2015 |
| CN | 107170087 A | 9/2017 |
| CN | 206805655 U | 12/2017 |
| CN | 206956597 U | 2/2018 |
| CN | 107909688 A | 4/2018 |
| WO | 2014140048 A1 | 9/2014 |

OTHER PUBLICATIONS

Written Opinion in PCT/CN2018/123889 dated Sep. 30, 2019, 4 pages.
The Extended European Search Report in European Application No. 18944241.1 dated Oct. 27, 2021, 8 pages.

\* cited by examiner

GATE DEVICE SYSTEM AND CONTROL METHOD THEREOF

CROSS-REFERENCE TO RELATED APPLICATIONS

This application is a continuation of International Patent Application No. PCT/CN2018/123889, filed on Dec. 26, 2018, the contents of which are hereby incorporated by reference.

TECHNICAL FIELD

The present application generally relates to a gate device, and more particularly, to the gate device configured to detect, alarm, and prevent an illegal tailgating behavior, and the control method thereof.

BACKGROUND

A gate device provided at the entrance or exit of an apartment, an office, a train station, an airport, or the like, may allow one object with an authorization of entry-exit to go through the gate device, but prevent any other objects lacking such the authorization. However, on some occasions, an object lacking the authorization attempts to go through the entrance or exit by tailgating the object with the authorization, which is so-called tailgating event. Therefore, it is desirable to develop a gate device system for efficiently preventing the tailgating event, and the control method thereof.

SUMMARY

One aspect of the present disclosure relates to a method for controlling a gate device. The method may include one or more operations as follows. An identification module may identify an authorization status of an object. A pressure sensor module may detect pressure signals caused by the object at a first moment if the authorization status is satisfied. A processing module may determine whether or not an illegal tailgating event occurred based on the pressure signals. The processing module may generate a control signal for opening the at least one gate to facilitate the object to pass through the at least one gate in response to a determination that the illegal tailgating event did not occur.

In some embodiments, the processing module may generate an instruction for triggering a display module to display an alert signal for warning the illegal tailgating event.

In some embodiments, the processing module may generate pressure information by processing the pressure signals corresponding to the first moment. The pressure information may include at least one first trigger region, a center point of the at least one first trigger region. The processing module may determine a first number of the at least one first trigger region. The processing module may determine that the illegal tailgating event does not occur if the first number is equal to or less than two.

In some embodiments, if the first number is greater than two, the processing module may determine at least one second trigger region from the at least one first trigger region, wherein an area of the at least one second trigger region is within a first area range. The processing module may determine a second number of the at least one second trigger region. The processing module may determine that the illegal tailgating event did not occur if the second number is equal to or less than two. The processing module may determine that the illegal tailgating event occurred if the second number is greater than two.

In some embodiments, the at least one first trigger region may include a plurality of sub-first trigger regions corresponding to the first moment, and a distance between center points of two of the plurality of sub-first trigger regions may be less than a first predetermined threshold.

In some embodiments, the at least one first trigger region may include a plurality of sub-first trigger regions corresponding to the first moment, and a shortest distance between edges of two of the plurality of sub-first trigger regions may be less than a second predetermined threshold.

In some embodiments, the pressure sensor module may detect the pressure signals caused by the object at a second moment. The processing module may generate at least one third trigger region by processing the pressure signals corresponding to the second moment. The processing module may determine a third number of the at least one third trigger region. The processing module may determine that the object has gone through the gate device if the third number is equal to zero. The processing module may generate the control signal for closing the at least one gate in response to a determination that the object has gone through the gate device.

In some embodiments, the processing module may determine at least one fourth trigger region from the at least one third trigger region, wherein an area of the at least one fourth trigger region is within the first area range if the third number is not equal to zero. The processing module may determine a fourth number of the at least one fourth trigger region. The processing module may generate the instruction for triggering the display module to display the alert signal for reminding the object to go through the gate device as soon as possible if the fourth number is equal to one or two. The processing module may generate the instruction for triggering the display module to display the alert signal for warning the illegal tailgating event if the fourth number is greater than two.

In some embodiments, a time difference of the first moment and the second moment may be within a predetermined time threshold.

In some embodiments, the predetermined time threshold is adjusted according to an object type.

In some embodiments, the object type may include a person and/or a wheel-based object.

In some embodiments, the object type may be determined based on a pressure track from the first moment to the second moment.

Another aspect of the present disclosure relates to a gate device system. The gate device system may include at least one storage device storing a set of instructions, a plurality of pressure sensors configured to detect pressure signals caused by an object, at least one processor in communication with the at least one storage device and the plurality of pressure sensors. When executing the set of instructions, the at least one processor may cause the system to perform one or more operation as follows. The system may identify an authorization status of an object. The system may detect pressure signals caused by the object at a first moment if the authorization status is satisfied. The system may determine whether or not an illegal tailgating event occurred based on the pressure signals. The system may generate a control signal for opening the at least one gate to facilitate the object to pass through the at least one gate in response to a determination that the illegal tailgating event did not occur.

Another aspect of the present disclosure relates to a non-transitory computer readable medium. The non-transitory computer readable medium may include at least one set of instructions for controlling a gate device. When executed by at least one processor, the at least one set of instructions causes the at least one processor to perform a method as follows. The method may include: identifying an authorization status of an object; detecting pressure signals caused by the object at a first moment, if the authorization status is satisfied; determining whether or not an illegal tailgating event occurred based on the pressure signals; generating a control signal for opening the at least one gate to facilitate the object to pass through the gate device in response to a determination that the illegal tailgating event did not occur.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The methods, systems, and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1A:
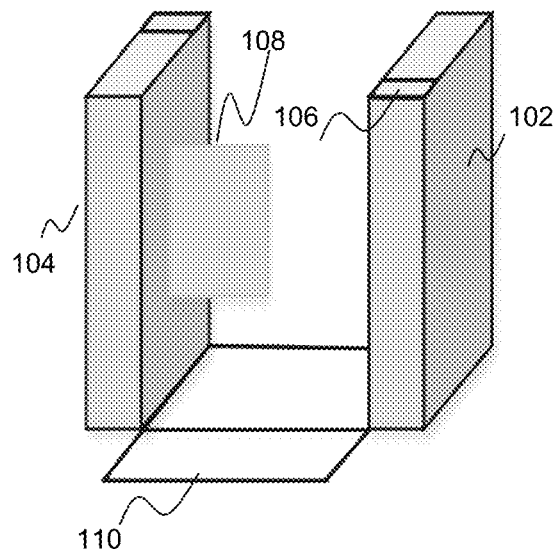
FIG. 1A is a schematic diagram illustrating an exemplary gate device according to some embodiments of the present disclosure.

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

It will be understood that the term "system," "engine," "unit," "module," and/or "block" used herein are one method to distinguish different components, elements, parts, section or assembly of different level in ascending order. However, the terms may be displaced by other expression if they may achieve the same purpose.

Generally, the word "module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or other storage device. In some embodiments, a software module/unit/block may be compiled and linked into an executable program. It will be appreciated that software modules can be callable from other modules/units/blocks or from themselves, and/or may be invoked in response to detected events or interrupts. Software modules/units/blocks configured for execution on computing devices may be provided on a computer readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in firmware, such as an EPROM. It will be further appreciated that hardware modules (or units or blocks) may be included in connected logic components, such as gates and flip-flops, and/or can be included in programmable units, such as programmable gate arrays or processors. The modules (or units or blocks) or computing device functionality described herein may be implemented as software modules (or units or blocks), but may be represented in hardware or firmware. In general, the modules (or units or blocks) described herein refer to logical modules (or units or blocks) that may be combined with other modules (or units or blocks) or divided into sub-modules (or sub-units or sub-blocks) despite their physical organization or storage.

It will be understood that when a unit, engine, module, or block is referred to as being "on," "connected to," or "coupled to" another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

The terminology used herein is for the purposes of describing particular examples and embodiments only and is not intended to be limiting. As used herein, the singular forms "a," "an," and "the" may be intended to include the plural forms as well, unless the context clearly indicates otherwise. It will be further understood that the terms "include" and/or "comprise," when used in this disclosure, specify the presence of integers, devices, behaviors, stated features, steps, elements, operations, and/or components, but do not exclude the presence or addition of one or more other integers, devices, behaviors, features, steps, elements, operations, components, and/or groups thereof.

Various embodiments of the present disclosure may be provided as a gate device system configured to control entry-exit of an object. The gate device system may be installed at an entrance or exit of an office, a building, a train station, or an airport, etc. The gate device system may be capable of preventing false determination such that a second object without an authorization may pass through the gate device by tailgating a first object with the authorization. In the gate device system, a plurality of pressure sensors may be disposed on a passage region. The gate device system may make a determination, based on pressure signals detected by at least one portion of the pressure sensors, whether or not the tailgating event occurred while an authorized object is going through the gate device.

FIG. 1A is a schematic diagram illustrating an exemplary gate device according to some embodiments of the present disclosure. The gate device 100 may be provided at the entrance or exit of an apartment, an office, a public place (e.g., a bus station, a train station, an airport, or a shopping mall), or a private place (e.g., a senior club). As shown in FIG. 1, the gate device 100 may allow the passage of an object (e.g., a person, a robot, a vehicle) with an entry or exit pass, which is registered in a gate device system (e.g., a gate device system 200) in advance. In some embodiments, the gate device 100 may allow objects to pass one by one in order, and prevent tailgating behavior. The gate device 100 may include a first framework 102, a second framework 104, a display 106, a gate 108, and a pressure sensor arrangement 110.

The first framework 102 and the second framework 104 may be the supporting body of the gate device 100. Materials of the first framework 102 and the second framework 104 may include metal materials, non-metal materials, organic materials, inorganic materials, or the like, or any combination thereof. A section between the first framework 102 and the second framework 104 may be designated as a passage region. The objects may pass through the passage region when the gate 108 is open. In some embodiments, some hardware or software modules/units/blocks/circuits may be arranged inside of the first framework 102 or the second framework 104. For example, there are one or more components of the gate device system 200 disposed inside of the first framework 102, such as a control circuit 112 shown in FIG. 1B. In some embodiments, for the sake of beauty, the first framework 102 and the second framework 104 may be symmetric, having the same specification, for example, sizes (e.g., 1200 mm (length)×265 mm (width)×1980 mm (height)), materials (e.g., SUS304 stainless steel), and shapes.

In some embodiments, the display 106 may be disposed on the first framework 102 and/or the second framework 104. The display 106 may be configured to display image information, audio information, video information for the object (e.g., a person, a robot, etc.). For example, the display 106 may display an alert for warning an illegal tailgating event. As another example, the display 106 may display an alert for reminding the object to go through the gate device 100 as soon as possible, not stopping, or standing. In some embodiments, the display 106 may be integrated with a read or scan unit to read or scan pass information with regard to an object in order to verify an authorization status of the object. For example, the display 106 may show a user interface for card identification, code identification, face identification, voice identification, fingerprint identification, etc.

In some embodiments, the display 106 may include a electroluminescent display (ELD), a light emitting diode display (LED), a cathode ray tube (CRT), a liquid-crystal display (LCD), a plasma display panel (PDP), an organic light-emitting diode (OLED), an organic light-emitting transistor (OLET), a surface-conduction electron-emitter display (SED), a field emission display (FED), a quantum dot display (QD-LED), a ferroelectric liquid crystal display (FLCD), a telescopic pixel display (TPO), a laser-powered phosphor display (LPD), any other circuit and/or display capable of executing the functions described herein, or the like, or any combination thereof.

Figure 1B:
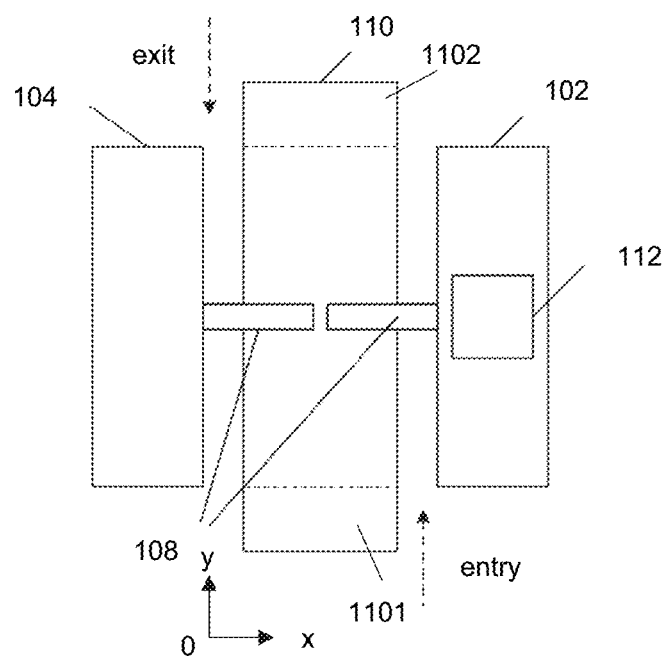
FIG. 1B is a perspective view of the exemplary gate device of FIG. 1A according to some embodiments of the present disclosure.

In some embodiments, the gate 108 may be configured to control the entry-exit of the object. In general, each framework may connect to one gate. Herein only one gate is shown in FIG. 1 for the purpose of illustration, and the other gate is not shown in FIG. 1. The gate 108 may include a turnstile, a swing or flap gateway, etc. In some embodiments, the gate 108 may be in close state when no one passes through the passage region. Upon receipt of control signal for opening the gate from a control circuit 112, the gate 108 may be opened via an electric actuator (not shown in FIG. 1A or 1B).

In some embodiments, the pressure sensor arrangement 110 may be disposed on the passage region. The pressure sensor arrangement 110 may include a plurality of pressure sensors arranged in array. The plurality of pressure sensors may include but limited to piezoelectric pressure sensors, piezoresistive pressure sensors, diaphragm type pressure sensors, and so on.

The pressure sensor arrangement 110 may be housed in a single pad or a cabinet that is easy to be disposed on the floor of the passage region. The plurality of pressure sensors may be configured to detect pressure signals caused by the object. In some embodiments, the pressure sensor arrangement 110 may be disposed on at least one portion of the passage region. For example, for controlling unidirectional entry or exit, the pressure sensor arrangement 110 may be disposed on a predetermined area at the entry or exit of gate device 100. In some embodiments, the pressure sensor arrangement 110 may be disposed along the entire passage region for controlling bidirectional entry-exit. As shown in FIG. 1B, the pressure sensor arrangement 110 is disposed on the entire passage region.

FIG. 1B is a perspective view of the gate device 100 shown in FIG. 1A. Two dotted arrow indicate entry and exit direction, respectively. Two gates 108 are disposed on the first framework 102 and the second framework 104, respectively. The control circuit 112 is integrated in the first framework 102. The control circuit 112 may connect to one or more components of the gate device 100 (e.g., the pressure sensor arrangement 110, the gate 108, the display 106). The control circuit 112 may be configured to process signals (e.g., pressure signals) to generate control instruction/signal for controlling the gate device 100. For example, the control circuit 112 may identify an authorization status of the object. If the authorization status is satisfied, the control circuit 112 may output a control signal for opening the gate 108. As another example, the control circuit 112 may determine whether the illegal tailgating event occurred or not. Upon occurrence of the tailgating event, the control circuit 112 may generate an instruction for triggering the display 106 to display an alert signal for warning the illegal tailgating event. The alert signal may be displayed in various forms, such as an audio, an image, a visual light, a video.

Figure 2:
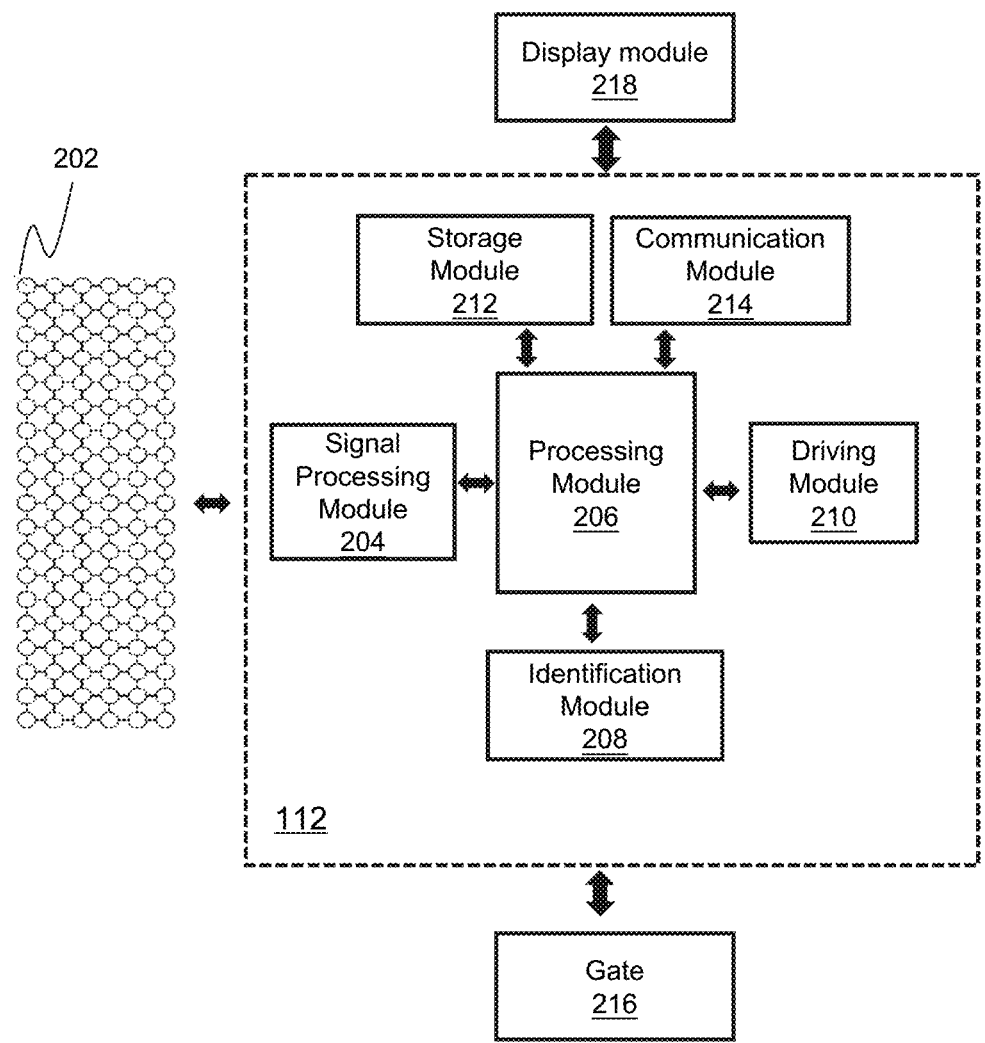
FIG. 2 is a schematic diagram illustrating an exemplary gate device system according to some embodiments of the present disclosure.

FIG. 2 is a schematic diagram illustrating an exemplary gate device system according to some embodiments of the present disclosure. The gate device system 200 may be implemented on the gate device 100. The gate device system 200 may be capable of processing signals caused by objects and detecting tailgating events. The control circuit 112 as shown in FIG. 1B may be implemented on the gate device system 200. The control circuit 112 may include a signal processing module 204, a processing module 206, an identification module 208, a driving module 210, a storage module 212, and a communication module 214. The control circuit 112 may connect to a pressure sensor module 202, a gate 216, and/or a display module 218 via a network (not shown in FIG. 2). In some embodiments, the network may be any type of wired or wireless network, or any combination thereof. Merely by way of example, the network may include a cable network, a wireline network, an optical fiber network, a telecommunications network, an intranet, an internet, a local area network (LAN), a wide area network (WAN), a wireless local area network (WLAN), a metropolitan area network (MAN), a wide area network (WAN), a public telephone switched network (PTSN), a Bluetooth network, a ZigBee network, a near field communication (NFC) network, or the like, or any combination thereof.

Figure 3:
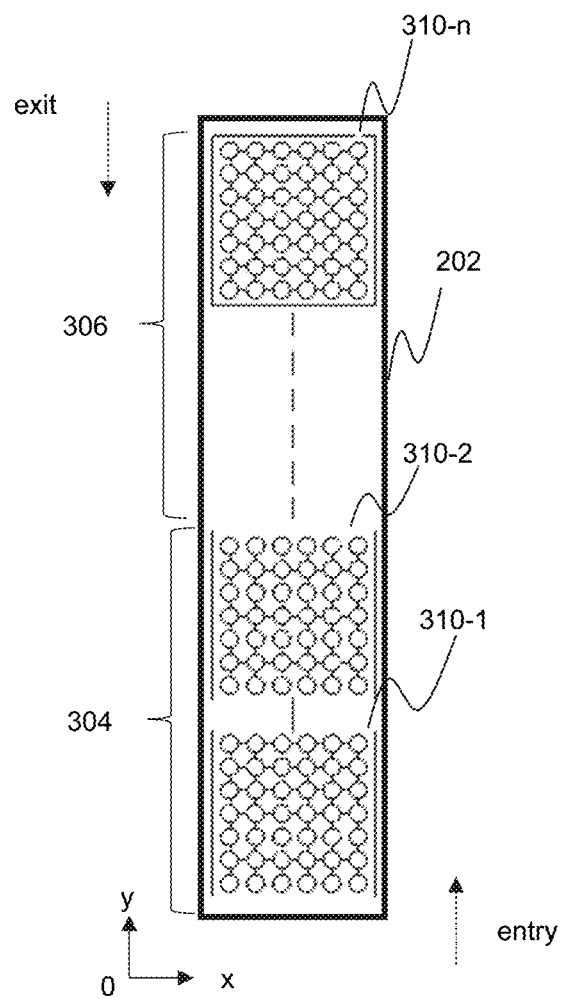
FIG. 3 is a schematic diagram illustrating an exemplary pressure sensor arrangement according to some embodiments of the present disclosure.

The pressure sensor module 202 may detect pressure signals caused by a load on the passage region. The pressure sensor module 202 may be configured with a plurality of pressure sensors housed in a single pad. The pad may be easy to be laid on the passage region. In some embodiments, the plurality of pressure sensors may include multiple groups of pressure sensors. For example, as shown in FIG. 3, the pressure sensor arrangement may include a first group 310-1, a second group 310-2, . . . , a n-th group 310-n. In some embodiments, the multiple groups may be arranged at a distance interval. For example, each two adjacent groups may be arranged at 20 mm interval. In some embodiments, the multiple groups may be substantially seamlessly arranged. Each group may include a plurality of pressure sensor units. Each pressure sensor unit is represented as a circle shown in FIG. 2 or FIG. 3. In some embodiments, at least one part of multiple groups may be triggered according to different scenarios. For example, first groups of pressure sensors 314 (including 310-1 and 310-2), which are disposed on the passage region from the entry to the gate swing area, are configured to detect the pressure signals at the entry. As another example, second groups of pressure sensors 306, which are disposed on the passage region from the exit to the gate swing area, are configured to detect the pressure signals at the exit. The first groups 304 and the second groups 306 may work independently. For example, when detecting the entry of the object, the first groups 304 are able to detect the pressure signals, but the second groups 306 are disable. As another example, when detecting the exit of the object, the second groups 306 are able to detect the pressure signals, but the second groups 304 are disable.

The signal processing module 204 may receive the pressure signals from the pressure sensor module 202, and process the pressure signals. In some embodiments, the signal processing module 204 may include a signal processing circuit for processing signals detected by the pressure sensors. Exemplary signal processing circuit may include a signal amplification circuit, a signal conversion circuit, a signal filtering circuit, any other circuit capable of executing the functions described herein, or the like, or any combination thereof. The signal amplification circuit may amplify the pressure signals. The signal conversion circuit may convert the pressure signals, e.g., analog signal to digital signal, or digital signal to analog signal. The signal filtering circuit may filter the pressure signals for reducing noises.

The processing module 206 may process information and/or data related to the object. In some embodiments, the processing module 206 may generate a control instruction/signal for driving the gate to open or close based on the pressure signals. In some embodiments, the processing module 206 may determine whether or not an illegal tailgating event occurred based on the pressure signals. In some embodiments, upon occurrence of the illegal tailgating event, the processing module 206 may generate an instruction for triggering the display module 218 to display an alert signal for warning the illegal tailgating event. In some embodiments, the processing module 206 may identify a type of object based on the pressure signals.

Merely by way of example, the processing module 206 may implemented on one or more processing devices. Exemplary processing devices may include a central processing unit (CPU), an application-specific integrated circuit (ASIC), an application-specific instruction-set processor (ASIP), a graphics processing unit (GPU), a physics processing unit (PPU), a digital signal processor (DSP), a field-programmable gate array (FPGA), a programmable logic device (PLD), a controller, a microcontroller unit, a reduced instruction-set computer (RISC), a microprocessor, or the like, or any combination thereof.

The identification module 208 may be configured to identify an authorization status of the object. For example, the authorization status may include allowable access or forbidden access. The allowable access indicates the object may be free to enter or exit. On the contrary, the forbidden access indicates the object may be forbidden to enter or exit. The identification module 208 may obtain the authorization status from the storage module 212. In some embodiments, the pass information of the allowable access regarding an object may be registered in the gate device system 200 in advance, and stored in the storage module 212. The identification module 208 may receive an input of the object, and verify the authorization status of the object by querying the storage module 212. In some embodiments, the identification module 208 may receive the pass information regarding an object through a read or scan unit (not shown in FIG. 2). The read or scan unit may be integrated to the display module 218. The read or scan unit may be configured to obtain card information, code information, face information, voice information, fingerprint information, or the like. Accordingly, the identification module 208 may identify the authorization status by the card identification, the code identification, the face identification, the voice identification, the fingerprint identification.

The driving module 210 may drive the gate 216 to open or close. For example, upon receipt of a control signal for opening, the driving module 210 may open the gate via the electric actuator connected to the gate 216. As another example, upon receipt of a control signal for closing, the driving module 210 may close the gate via the electric actuator connected to the gate 216.

The storage module 212 may store data and/or instructions. For example, the data may relate to pressure information, authorization status, pass information regarding an object, or the like, or any combination thereof. In some embodiments, the storage module 212 may store data obtained from other modules of the gate device system 100 (e.g., the pressure module 202, the identification module 208, the display module 218, etc.). In some embodiments, the storage module 212 may store data and/or instructions that the control circuit 112 may execute or use to perform exemplary methods described in the present disclosure.

In some embodiments, the storage module 212 may be implemented on a storage device. In some embodiments, the storage device may include a mass storage, a removable storage, a volatile read-and-write memory, a read-only memory (ROM), or the like, or any combination thereof. Exemplary mass storage may include a magnetic disk, an optical disk, a solid-state drives, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically-erasable programmable ROM (EEPROM), a compact disk ROM (CD-ROM), and a digital versatile disk ROM, etc. In some embodiments, the storage module 212 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

The communication module 214 may facilitate exchange of information and/or data. In some embodiments, one or more components in the gate device system 200 (e.g., the pressure sensor module 202, the signal processing module 204, the processing module 206, the identification module 208, the driving module 210, the storage module 212, or the display module 218) may send information and/data to other component(s) in the gate device system 200 via the communication module 214. In some embodiments, the communication module 214 may facilitate exchange of information and/or data via input/output (I/O) ports connected to the one or more modules.

The display module 218 may display information from the processing module 206. For example, the display module 218 may display an alert for warning the illegal tailgating event. As another example, the display module 218 may display an alert to remind the object to go through the gate device as soon as possible. In some embodiments, the display module 218 may also display advertisement when the gate device system 200 is in idle state. In some embodiments, the display module 218 may be implemented on a display device. Exemplary display device may include a electroluminescent display (ELD), a light emitting diode display (LED), a cathode ray tube (CRT), a liquid-crystal display (LCD), a plasma display panel (PDP), an organic light-emitting diode (OLED), an organic light-emitting transistor (OLET), a surface-conduction electron-emitter display (SED), a field emission display (FED), a quantum dot display (QD-LED), a ferroelectric liquid crystal display (FLCD), a telescopic pixel display (TPO), a laser-powered phosphor display (LPD), any other circuit and/or display capable of executing the functions described herein, or the like, or any combination thereof.

It should be noted that the above description is merely provided for the purposes of illustration, and not intended to limit the scope of the present disclosure. For persons having ordinary skills in the art, multiple variations and modifications may be made under the teachings of the present disclosure. For example, the signals processing module 204, the identification module 208, and the driving module 210 may be integrated into the processing module 206. However, those variations and modifications do not depart from the scope of the present disclosure.

Figure 4:
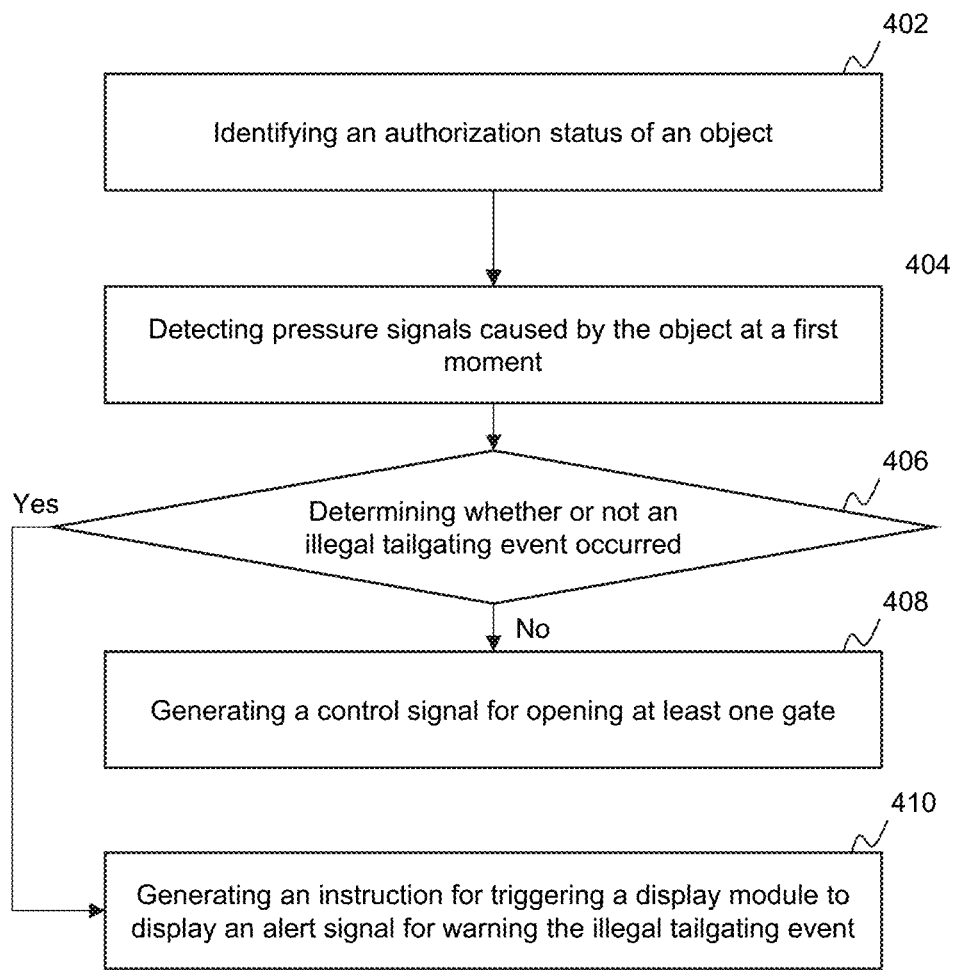
FIG. 4 is a flowchart illustrating an exemplary process for controlling a gate device according to some embodiments of the present disclosure.

FIG. 4 is a flowchart illustrating exemplary process for controlling a gate device according to some embodiments of the present disclosure. In some embodiments, process 400 for controlling the gate device may be implemented on the gate device system 200 as illustrated in FIG. 2. For example, the process 400 may be implemented by the control circuit 112. The process 400 may also be implemented as one or more instructions stored in the storage module 212 and called and/or executed by at least one processor executing the control circuit 112. The operations of the illustrated process presented below are intended to be illustrative. In some embodiments, the process 400 may be accomplished with one or more additional operations not described, and/or without one or more of the operations discussed. Additionally, the order in which the operations of the process 400 as illustrated in FIG. 4 and described below is not intended to be limiting.

In 402, the identification module 208 may identify an authorization status of an object. The object may include but not limited to a person, a vehicle, a package, a wheelchair, and so on.

In some embodiments, at least one gate of the gate device 100 may be closed in idle state. When the object satisfies the authorization status, the at least one gate may be open to facilitate the object to go through the passage region. Otherwise, the object may be forbidden to go through the passage region. In some embodiments, the authorization status may include allowable access or forbidden access. The allowable access indicates the object may be free to enter or exit. On the contrary, the forbidden access indicates the object may be forbidden to enter or exit. In some embodiments, the authorization status may be identified based on object information registered in the gate device system 100 in advance. The object information may include but not limited to a name, a identify card number, a phone number, an address, a job, a company, an authorization status, and so on. In some embodiments, the identification module 208 may receive the pass information through a read or scan unit. The read or scan unit may be disposed on a user interface of the display 106. The read unit obtain the pass information indicative of the authorization status, such as card information, code information, face information, voice information, fingerprint information, or the like. Furthermore, the identification module 208 may identify whether an object is the authorized object or not by the card identification, the code identification, the face identification, the voice identification, the fingerprint identification, or the like. For those skilled in the art, the read unit may be disposed separate from the display module 208.

In some embodiments, the object may be identified only in a specific region. The specific region may be designated as an identification zone. For example, as shown in FIG. 1B, region 1101 or 1102, ranging from the starting line to the dotted line at the entrance or exit, is designated as the identification zone at entry side or exit side, respectively. As long as the object is in the identification zone, the identification module 208 would be prompted to verify the authorization status. In some embodiments, the pressure sensors may be arranged in the identification zone. When the object steps on the identification zone, the pressure sensors may detect pressure signals indicative of the load caused by the object. The pressure signals may be sent to the processing module 206. Then the processing module 206 may determine a trigger region based on the pressure signals. The trigger region may refer to a load region covering the pressure sensor units that generate the pressure signals. Each pressure sensor unit may be configured to detect load occurred in a sub-region. For example, a size of the sub-region may be 2 cm×2 cm, 5 cm×5 cm, or 10 cm×10 cm, etc.

The size of the sub-region may depend on the pressure sensor unit. In some embodiments, the processing module 206 may determine a center point of the trigger region, that is, a centroid coordinate (x, y). If the center point is in the identification zone, the identification module 208 may be directed to verify the authorization status of the object. Otherwise, the authorization status may not be verified by the identification module 208. In this case, the processing module 206 may generate an alert signal for reminding the object to back to the identification zone in order to the identification.

In general, the authorized object may be allowed to go through the gate device legally. However, on some occasions, an unauthorized object attempts to go through the gate device (e.g., tailgating). Such an unauthorized attempt may be forbidden.

In 404, the pressure sensor module 202 may detect pressure signals caused by the object at a first moment if the authorization status is satisfied. It is should be understood that the first moment is later than the time when the authorization status is verified. As shown in FIG. 1B, the plurality of pressure sensors may be disposed on the entire surface of passage region. When the object steps on the passage region, at least one portion of the plurality of pressure sensors may detect the pressure signals corresponding to the load caused by the object. In some embodiments, the pressure sensor module 202 may detect pressure signals caused by the entry of exit of the object independently. For example, referring to FIG. 3, when detecting the entry of the object, the first groups 304 are able to detect the pressure signals, but the second groups 306 are disable. As another example, when detecting the exit of the object, the second groups 306 are able to detect the pressure signals, but the second groups 304 are disable.

In 406, the processing module 206 may determine whether or not an illegal tailgating event occurred based on the pressure signals.

In some embodiments, the generated pressure signals may be processed by the signals processing module 204, for example, a signal amplification, a signal conversion, and/or a signal filtering, etc. The processed signals may be sent to the processing module 206 for further processing. In some embodiments, the generated pressure signals may be directly sent to the processing module 206 for further processing regardless of the processing of the signal processing module 204.

In some embodiments, the processing module 206 may generate pressure information by processing the pressure signals corresponding to the first moment. The pressure information may include at least one trigger region, a center point of the at least one trigger region. The processing module 206 may further determine whether or not the illegal tailgating event occurred based on the pressure information. More descriptions of the detecting the illegal tailgating event may be found elsewhere in the present disclosure (e.g., FIGS. 5A and 5B, and the descriptions thereof).

In 408, the processing module 206 may generate a control signal in response to a determination whether or not an illegal tailgating event occurred. In some embodiments, if the illegal tailgating event is not detected, the processing module 206 may generate the control signal for opening the at least one gate 216 to facilitate the object to pass through the gate device. Upon receipt of the control signal indicative of the opening, the driving module 210 may drive the at least one gate 216 to open via the electric actuator. In some embodiments, if the illegal tailgating event is detected, the processing module 206 may generate an instruction for triggering the display module 218 to display an alert signal for warning the object of the illegal tailgating event, as illustrated in 410. The alert signal may be displayed in various forms, such as an audio, an image, a visual light, a video. For example, the display module 218 may broadcast voice indicative of the illegal tailgating event (e.g., "tailgating is illegal"). As another example, the display module 218 may flash a red light for warning the tailgating. When the tailgating issue is resolved, the gate device system 200 may allow the object to pass.

It should be noted that the above description is merely provided for the purpose of illustration, and not intended to limit the scope of the present disclosure. For persons having ordinary skills in the art, multiple variations and modifications may be made under the teachings of the present disclosure. For example, the processing module 206 may generate a control signal for closing the gate after passing through the passage region. However, those variations and modifications do not depart from the scope of the present disclosure.

Figure 5A:
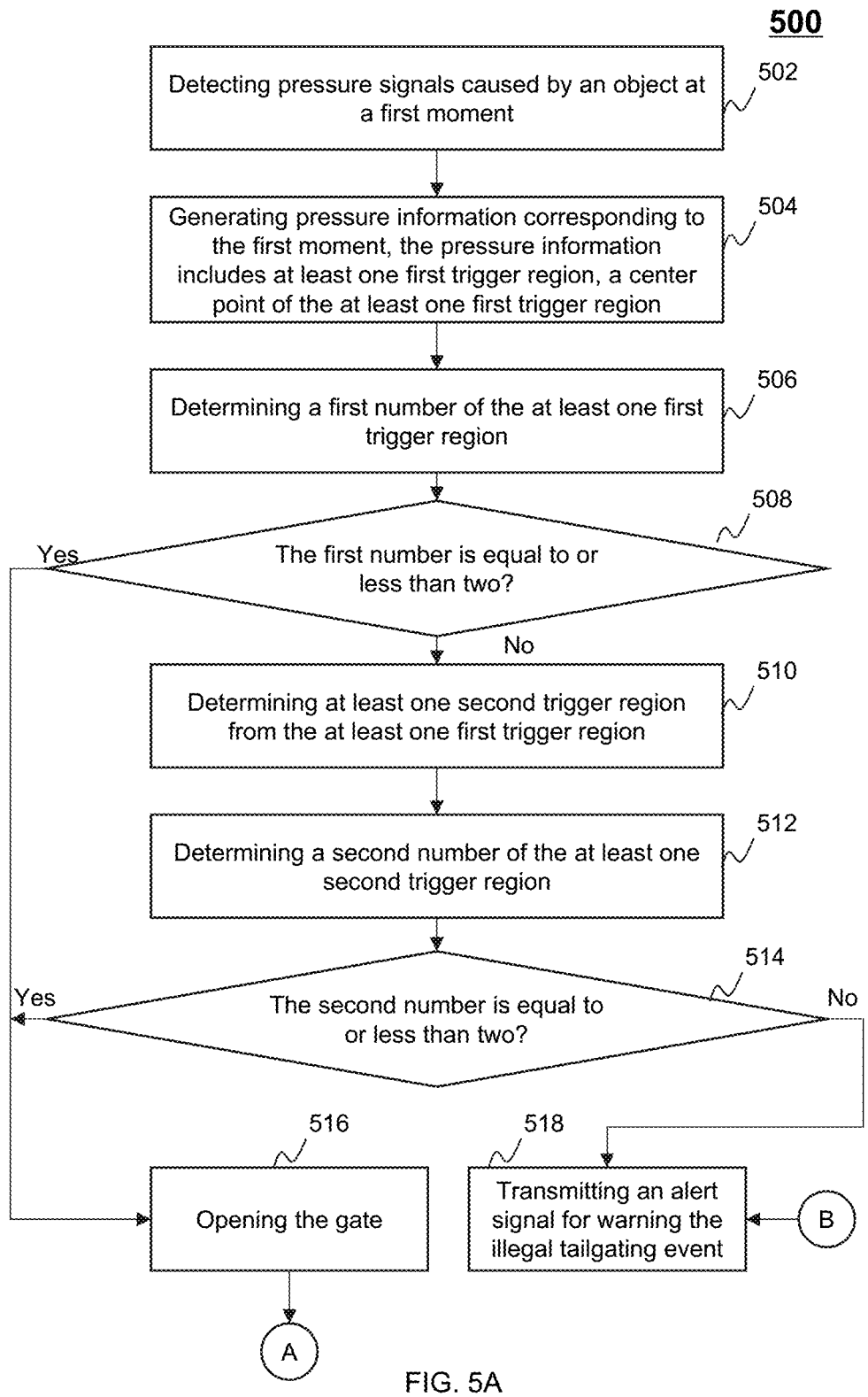
FIGS. 5A and 5B are flowcharts illustrating exemplary processes for controlling a gate device according to some embodiments of the present disclosure.
Figure 5B:
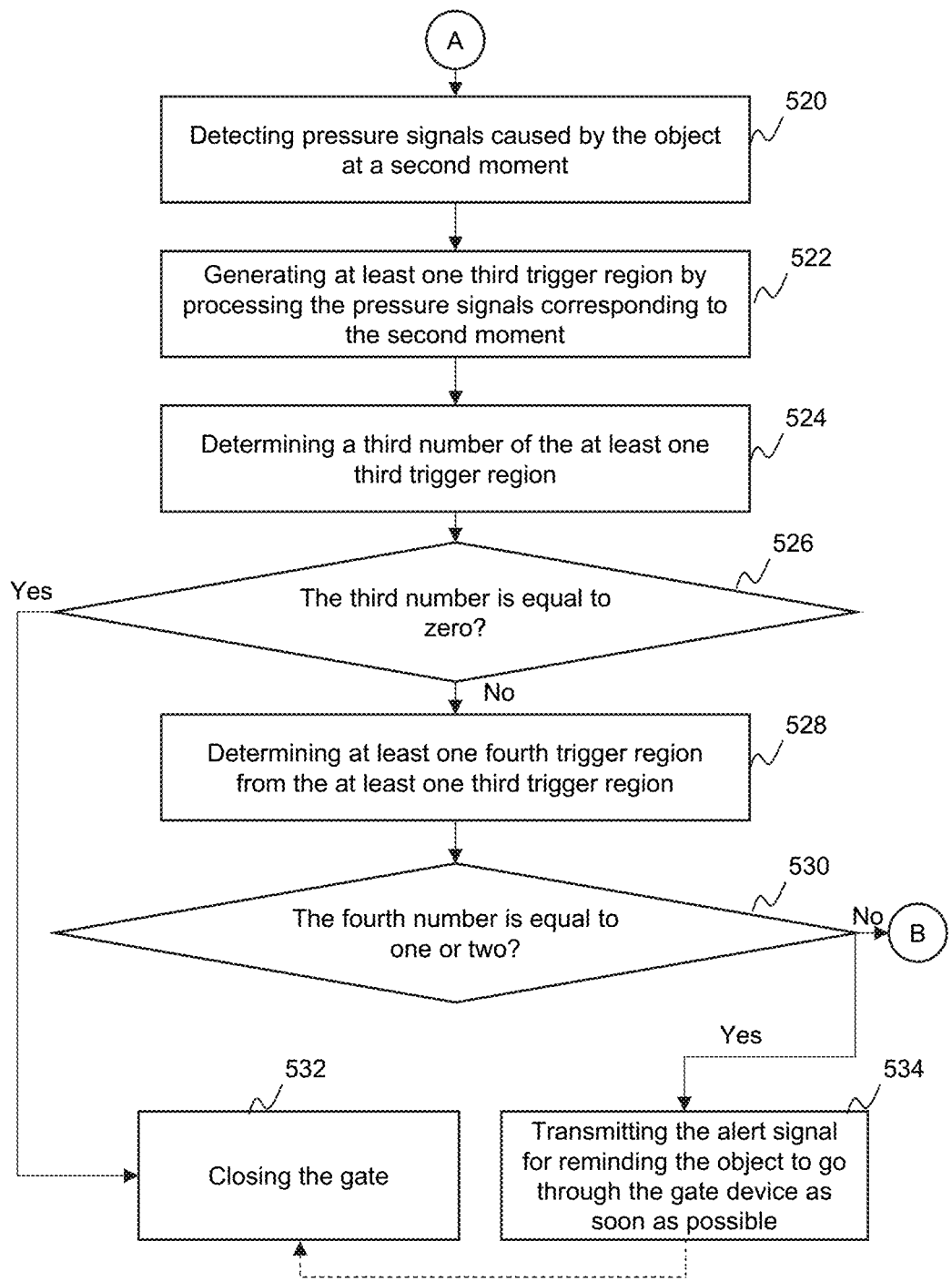

FIGS. 5A and 5B are flowcharts illustrating exemplary processes for controlling a gate device according to some embodiments of the present disclosure. In some embodiments, process 500 for controlling the gate device may be implemented on the gate device system 200 as illustrated in FIG. 2. For example, the process 500 may be implemented by the control circuit 112. The process 500 may also be implemented as one or more instructions stored in the storage module 212 and called and/or executed by at least one processor executing the control circuit 112. The operations of the illustrated process presented below are intended to be illustrative. In some embodiments, the process 500 may be accomplished with one or more additional operations not described, and/or without one or more of the operations discussed. Additionally, the order in which the operations of the process 500 as illustrated in FIGS. 5A and 5B, and described below is not intended to be limiting.

In 502, the pressure module 202 may detect pressure signals caused by the object at a first moment. The first moment may be later than a time when the authorization status is verified. The pressure signals, corresponding to the load caused by the object, may be detected by the pressure module 202.

In 504, the processing module 206 may generate pressure information corresponding to the first moment. The pressure information may include at least one first trigger region, a center point of the at least one first trigger region. The trigger region may refer to a load region covered by the pressure sensor units that generate the pressure signals. In some embodiments, the trigger region may correspond to a contact region between the object and the passage region configured with the plurality of pressure sensors. For example, the trigger regions corresponding to a person's shoes may include the part of shoe heels and the part of shoe heads. The part of shoe heels may be separate from the part of shoe heads (particularly high-heeled shoes). In this case, the trigger region includes a plurality of sub-trigger regions, e.g., the part of a heel and the part of a head. In some embodiments, when a distance between center points of two of the plurality of sub-trigger regions is less than a first predetermined threshold (e.g., 8 cm, 9 cm, 10 cm, 11 cm, 12 cm, etc.), the two sub-trigger regions may be designated as a whole trigger region. In some embodiments, a shortest distance of edges of two of the plurality of sub-trigger regions may be determined. When the shortest distance is less than a second predetermined threshold (e.g., 8 cm, 9 cm, 10 cm, 11 cm, 12 cm, etc.), the two sub-trigger regions may be designated as a whole trigger region. In some embodiments, the second predetermined threshold may be the same or different from the first predetermined threshold. In some embodiments, the trigger regions may be at the same side of the object to pass through the gate device, in regardless of the opposite side.

Figure 6:
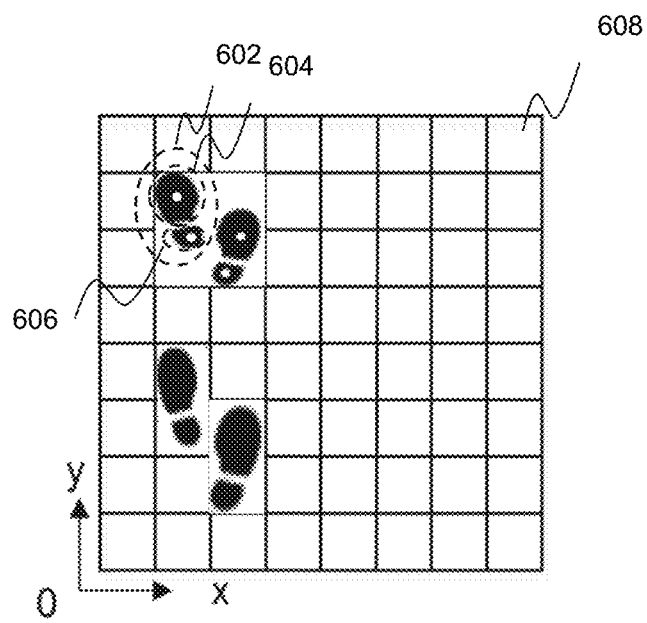
FIG. 6 is a schematic diagram illustrating a trigger region including one or more sub-trigger regions according to some embodiments of the present disclosure.

Merely for illustration, as shown in FIG. 6, let a grid 608 be a pressure sensor unit, let a dark region be a sub-trigger region, let a solid dot be a center point of the sub-trigger region. Because the distance between center points of a first sub-trigger region 604 and a second sub-trigger region 606 is less than the first predetermined threshold, the first sub-trigger region 604 and the second sub-trigger region 606 may be designated as the trigger region 602.

Similarly, the processing module 206 may determine a plurality of sub-first trigger regions included in the at least one first trigger region. The distance between center points of two of the plurality of sub-first trigger regions may be less than the first predetermined threshold.

In 506, the processing module 206 may determine the number of the first trigger region (herein also referred to as a first number of the first trigger region).

In 508, the processing module 206 may determine whether the first number is equal to or less than two. In some embodiments, if the first number is equal to or less than two, the processing module 206 may determine that the illegal tailgating event did not occur. It should be understood that, if there is only one object (e.g., a person or a wheelchair) on the passage region, the number of trigger region caused by the object should be equal to or less than two. For example, two shoes or two wheels correspond to two trigger regions respectively. In some embodiments, if the illegal tailgating event did not occur, the processing module 206 may generate the control signal for opening the at least one gate to facilitate the object to pass through the gate device. The driving module 210 may open the at least one gate in response to the control signal, as illustrated in 516.

In some embodiments, if the first number is greater than two, the processing module 206 may further determine whether the illegal tailgating event occurred or not. Specifically, in 510, the processing module 206 may determine at least one second trigger region from the at least one first trigger region. An area of the at least one second trigger region is within a first area range. The first area range may be denoted as [A, B], where A denotes a minimum area value, B denotes a maximum area value. For example, the first area range may be predetermined as [50 cm$^2$, 300 cm$^2$]. Noted that the first area range may be adjusted by the gate device system 200. The first area range may be used to filter a disturbed trigger region. For example, assuming that a person carrying a wheel-based package desires to go through the passage region, the number of trigger regions caused by the person and the package may be greater than two (e.g., four or six). In this occasion, the tailgating event may not occur. Because the trigger regions caused by small wheels may be far less than ones caused by the person's shoes, the processing module 206 may filter the trigger regions caused by the wheels by using the area range, and determine the trigger regions just caused by the person.

In 512, the processing module 206 may determine the number of the second trigger region (herein also referred to as a second number of the second trigger region).

In some embodiments, if the second number is equal to or less than two, the processing module 206 may determine that the illegal tailgating event did not occur. Accordingly, the processing module 206 may generate the control signal for opening the at least one gate to facilitate the object to pass through the gate device. The driving module 210 may open the gate in response to the control signal, as illustrated in 516.

In some embodiments, if the second number is greater than two, the processing module 206 may determine that the illegal tailgating event occurred. Then the processing module 206 may generate an instruction for triggering the display module 218 to display an alert signal for warning the illegal tailgating event, as illustrated in 518. The alert signal may be displayed in various forms, such as an audio, an image, a visual light, a video. For example, the display module 218 may broadcast voice indicative of the illegal tailgating event (e.g., "tailgating is illegal"). As another example, the display module 218 may flash a red light for warning the tailgating. When the tailgating issue is resolved, the gate device system 200 may allow the object to pass.

In some embodiments, the processing module 206 may determine whether or not the tailgating event occurred while the object is passing through the passage region, and whether or not the object leaves the passage region. Specifically, in 520, the pressure module 202 may detect pressure signals caused by the object at a second moment. The second moment is later than the first moment, and a time difference of the first moment and the second moment is within a predetermined time threshold (e.g., 10 seconds, 15 seconds, 20 seconds, etc.). The predetermined time threshold may refer to a default passing time from the entry to the exit.

In some embodiments, the predetermined time threshold may be adjusted according to an object type. The object type includes a person and/or a wheel-based object (e.g., a wheel-based package, a wheelchair). In some embodiments, the predetermined time threshold corresponding to the person may be shorter than the one corresponding to the wheel-based object. For example, the predetermined time threshold corresponding to the person may be set as 10 seconds, while the predetermined time threshold corresponding to the wheel-based object may be set as 15 seconds. In some embodiments, the processing module 206 may identify the object type based on a pressure track from the first moment to the second moment. For example, the pressure track corresponding to the person may be discontinuous due to the person's walking. As another example, the pressure track corresponding to the wheel-based object may be continuous due to its rolling.

In 522, the processing module 206 may generate the at least one third trigger region by processing the pressure signals corresponding to the second moment.

In 524, the processing module 206 may determine the number of the at least one third trigger region (herein also referred to as a third number of the at least one third trigger region).

In 526, the processing module 206 may determine whether or not the third number is equal to zero. In some embodiments, if the third number is equal to zero, the processing module 206 may determine that the object has gone through the gate device. Then the processing module 206 may generate the control signal for closing the at least one gate in response to a determination that the object has gone through the gate device. The driving module 210 may close the gate in response to the control signal, as illustrated in 532.

In some embodiments, if the third number is greater than zero, the processing module 206 may further determine whether or not the tailgating event occurred while the object is passing through the passage region. Specifically, in 528, the processing module 206 may determine at least one fourth trigger region from the at least one third trigger region. The area of the at least one fourth trigger region may be within the first area range. For example, the first area range may be predetermined as [50 cm$^2$, 300 cm$^2$].

In 530, the processing module 206 may determine the number of the at least one fourth trigger region (herein also referred to as a fourth number of the at least one fourth trigger region), and determine whether or not the fourth number is equal to one or two.

In some embodiments, if the fourth number is equal to one or two, the processing module 206 may determine that the tailgating event did not occur during the object is going through the gate device, and determine that the object may do not go through the gate device during the predetermined time threshold. Accordingly, the processing module 206 may generate and transmit the alert signal for reminding the object to go through the gate device as soon as possible, as illustrated in 534. The display module 534 may display the alert signal in various forms, such as an audio, an image, a visual light, a video. For example, the display module 218 may broadcast voice indicative of reminding the object to go through the gate device as soon as possible (e.g., "please leave the passage region"). As another example, the display module 218 may flash a yellow light for prompting the object to go through the gate device as soon as possible. When the object has gone through the gate device, the processing module 206 may generate the control signal for closing the gate. The driving module 210 may close the gate in response to the control signal, as illustrated in 532.

In some embodiments, if the fourth number is greater than two, the processing module 206 may determine that the illegal tailgating event occurred during the object is going through the gate device. Then the processing module 206 may generate the instruction for triggering the display module 218 to display the alert signal for warning the illegal tailgating event, as illustrated in 518.

It should be noted that the above description is merely provided for the purpose of illustration, and not intended to limit the scope of the present disclosure. For persons having ordinary skills in the art, multiple variations and modifications may be made under the teachings of the present disclosure. For example, operations 506 and 508 may be integrated to a single operation, operations 512 and 514 may be integrated to a single operation, operations 524 and 526 may be integrated to a single operation, or operations 528 and 530 may be integrated to a single operation. However, those variations and modifications do not depart from the scope of the present disclosure.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object-oriented programming language such as Java, Scala, Smalltalk, Eiffel, JADE, Emerald, C++, C#, VB. NET, Python or the like, conventional procedural programming languages, such as the "C" programming language, Visual Basic, Fortran 2103, Perl, COBOL 2102, PHP, ABAP, dynamic programming languages such as Python, Ruby, and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, for example, an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A method for controlling a gate device in connection with at least one gate, comprising:
    identifying, by an identification module, an authorization status of an object;
    detecting, by a pressure sensor module, pressure signals caused by the object at a first moment, if the authorization status is satisfied;
    determining, by a processing module, whether or not an illegal tailgating event occurred based on the pressure signals, including:
        generating, by the processing module, pressure information by processing the pressure signals corresponding to the first moment, wherein the pressure information includes at least one first trigger region, a center point of the at least one first trigger region;
        determining, by the processing module, a first number of the at least one first trigger region; and
        determining, by the processing module, that the illegal tailgating event does not occur if the first number is equal to or less than two;
        if the first number is greater than two, determining, by the processing module, at least one second trigger region from the at least one first trigger region, wherein an area of the at least one second trigger region is within a first area range;
        determining, by the processing module, a second number of the at least one second trigger region;
        determining, by the processing module, that the illegal tailgating event did not occur if the second number is equal to or less than two;
        determining, by the processing module, that the illegal tailgating event occurred if the second number is greater than two; and
    generating, by the processing module, a control signal for opening the at least one gate to facilitate the object to pass through the at least one gate in response to a determination that the illegal tailgating event did not occur.

2. The method of claim 1, further comprising:
    generating, by the processing module, an instruction for triggering a display module to display an alert signal for warning the illegal tailgating event.

3. The method of claim 1, wherein the at least one first trigger region includes a plurality of sub-first trigger regions corresponding to the first moment, and a distance between center points of two of the plurality of sub-first trigger regions is less than a first predetermined threshold.

4. The method of claim 1, wherein the at least one first trigger region includes a plurality of sub-first trigger regions corresponding to the first moment, and a shortest distance between edges of two of the plurality of sub-first trigger regions is less than a second predetermined threshold.

5. The method of claim 1, further comprising:
    detecting, by pressure sensor module, second pressure signals caused by the object at a second moment;
    generating, by the processing module, at least one third trigger region by processing the second pressure signals corresponding to the second moment;
    determining, by the processing module, a third number of the at least one third trigger region;
    determining, by the processing module, that the object has gone through the gate device if the third number is equal to zero;
    generating, by the processing module, the control signal for closing the at least one gate in response to a determination that the object has gone through the gate device.

6. The method of claim 5, further comprising:
    determining, by the processing module, at least one fourth trigger region from the at least one third trigger region, wherein an area of the at least one fourth trigger region is within the first area range if the third number is not equal to zero;

determining, by the processing module, a fourth number of the at least one fourth trigger region;

generating, by the processing module, the instruction for triggering the display module to display the alert signal for reminding the object to go through the gate device as soon as possible if the fourth number is equal to one or two; and generating, by the processing module, the instruction for triggering the display module to display the alert signal for warning the illegal tailgating event if the fourth number is greater than two.

7. The method of claim 5, wherein a time difference of the first moment and the second moment is within a predetermined time threshold.

8. The method of claim 7, wherein the predetermined time threshold is adjusted according to an object type.

9. The method of claim 8, wherein the object type includes at least one of a person or a wheel-based object.

10. The method of claim 9, wherein the object type is determined based on a pressure track from the first moment to the second moment.

11. A gate device system, comprising:
at least one storage device storing a set of instructions;
a plurality of pressure sensors configured to detect pressure signals caused by an object; and
at least one processor in communication with the at least one storage device and the plurality of pressure sensors, wherein when executing the set of instructions, the at least one processor is configured to cause the system to:
identify an authorization status of the object;
detect the pressure signals caused by the object at a first moment, if the authorization status is satisfied;
determine whether or not an illegal tailgating event occurred based on the pressure signals, wherein to determine whether or not an illegal tailgating event occurred based on the pressure signals, the at least one processor is configured to cause the system to:
generate pressure information by processing the pressure signals corresponding to the first moment, wherein the pressure information includes at least one first trigger region, a center point of the at least one first trigger region;
determine a first number of the at least one first trigger region; and
determine that the illegal tailgating event did not occur if the first number is equal to or less than two;
if the first number is greater than two, determine at least one second trigger region from the at least one first trigger region, wherein an area of the at least one second trigger region is within a first area range;
determine a second number of the at least one second trigger region;
determine that the illegal tailgating event did not occur if the second number is equal to or less than two;
determine that the illegal tailgating event occurred if the second number is greater than two; and
generate a control signal for opening the at least one gate to facilitate the object to pass through the at least one gate in response to a determination that the illegal tailgating event did not occur.

12. The system of claim 11, wherein the at least one processor is further configured to cause the system to:
generate an instruction for triggering a display module to display an alert signal for warning the illegal tailgating event.

13. The system of claim 11, wherein
the at least one first trigger region includes a plurality of sub-first trigger regions corresponding to the first moment, a distance between center points of two of the plurality of sub-first trigger regions is less than a first predetermined threshold, or
a shortest distance between edges of two of the plurality of sub-first trigger regions is less than a second predetermined threshold.

14. The system of claim 11, wherein the at least one processor is further configured to cause the system to:
detect second pressure signals caused by the object at a second moment;
generate at least one third trigger region by processing the second pressure signals corresponding to the second moment;
determine a third number of the at least one third trigger region;
determine that the object has gone through the gate device if the third number is equal to zero; and
generate the control signal for closing the at least one gate in response to a determination that the object has gone through the gate device.

15. The system of claim 14, wherein the at least one processor is further configured to cause the system to:
determine at least one fourth trigger region from the at least one third trigger region, wherein an area of the at least one fourth trigger region is within the first area range if the third number is not equal to zero;
determine a fourth number of the at least one fourth trigger region;
generate the instruction for triggering the display module to display the alert signal for reminding the object to go through the gate device as soon as possible if the fourth number is equal to one or two; and
generate the instruction for triggering the display module to display the alert signal for warning the illegal tailgating event if the fourth number is greater than two.

16. A non-transitory computer readable medium, comprising at least one set of instructions for controlling a gate device, wherein when executed by at least one processor, the at least one set of instructions causes the at least one processor to perform a method, the method comprising:
identifying an authorization status of an object;
detecting pressure signals caused by the object at a first moment, if the authorization status is satisfied;
determining whether or not an illegal tailgating event occurred based on the pressure signals, including:
generating pressure information by processing the pressure signals corresponding to the first moment, the pressure information includes at least one first trigger region, a center point of the at least one first trigger region;
determining a first number of the at least one first trigger region; and
determining that the illegal tailgating event does not occur if the first number is equal to or less than two;
if the first number is greater than two, determining, by the processing module, at least one second trigger region from the at least one first trigger region, wherein an area of the at least one second trigger region is within a first area range;

determining, by the processing module, a second number of the at least one second trigger region;
determining, by the processing module, that the illegal tailgating event did not occur if the second number is equal to or less than two;
determining, by the processing module, that the illegal tailgating event occurred if the second number is greater than two; and
generating a control signal for opening the at least one gate to facilitate the object to pass through the at least one gate in response to a determination that the illegal tailgating event did not occur.

* * * * *